(12) United States Patent  
Harlin (10) Patent No.: US 8,047,559 B2
(45) Date of Patent: Nov. 1, 2011

(54) SELF-LOCKING, UNIVERSAL TRAILER HITCH AND METHOD OF USE THEREOF

(76) Inventor: Barry Harlin, Roanoke, AL (US)

( * ) Notice: Subject to any disclaimer, the term of this patent is extended or adjusted under 35 U.S.C. 154(b) by 207 days.

(21) Appl. No.: 12/497,873

(22) Filed: Jul. 6, 2009

(65) Prior Publication Data

US 2010/0117334 A1 May 13, 2010

Related U.S. Application Data

(63) Continuation-in-part of application No. 12/267,821, filed on Nov. 10, 2008.

(51) Int. Cl.
*B60D 1/01* (2006.01)
*B60D 1/36* (2006.01)

(52) U.S. Cl. .................... 280/477; 280/508

(58) Field of Classification Search .............. 280/477, 280/507, 508, 509, 510, 511, 512, 513, 515
See application file for complete search history.

(56) References Cited

U.S. PATENT DOCUMENTS

| | | | |
|---|---|---|---|
| 2,062,788 A | 12/1936 | Jacob | |
| 2,478,736 A * | 8/1949 | Balzen | 280/477 |
| 2,525,471 A * | 10/1950 | Balzer | 280/508 |
| 2,552,885 A * | 5/1951 | Claud-Mantle | 280/477 |
| 3,046,038 A * | 7/1962 | Hollis | 280/512 |
| 3,161,422 A | 12/1964 | Wade | |
| 3,790,192 A * | 2/1974 | Green | 280/507 |
| 3,891,237 A | 6/1975 | Allen | |
| 3,912,302 A * | 10/1975 | Patterson | 280/477 |
| 4,312,516 A | 1/1982 | Olsen | |
| 4,417,748 A | 11/1983 | Dortch | |
| 4,560,184 A * | 12/1985 | Williams, Jr. | 280/477 |
| 4,606,549 A | 8/1986 | Williams, Jr. | |
| 4,759,564 A | 7/1988 | Williams, Jr. | |
| 4,811,965 A * | 3/1989 | Eubanks | 280/455.1 |
| 5,277,447 A | 1/1994 | Blaser | |
| 5,413,369 A * | 5/1995 | Trent | 280/477 |
| 5,779,256 A | 7/1998 | Vass | |
| 7,425,014 B1 * | 9/2008 | Palmer | 280/479.3 |
| 2004/0195802 A1 | 10/2004 | Allen et al. | |
| 2007/0086872 A1 | 4/2007 | Davis | |
| 2008/0073872 A1 | 3/2008 | Scott | |

OTHER PUBLICATIONS

U.S. Appl. No. 12/267,821, filed Nov. 10, 2008, Harlin.

* cited by examiner

*Primary Examiner* — Tony H. Winner
*Assistant Examiner* — Wesley Potter
(74) *Attorney, Agent, or Firm* — Williamson Intellectual Property Law, LLC; Thomas R. Williamson, III (57) ABSTRACT

A self-locking universal trailer hitch comprising a hitch receiver, a bar and a second receiver, wherein the hitch receiver is secured to a towing vehicle, and wherein the bar is removably secured to the hitch receiver, and wherein the second receiver comprises a locking mechanism to removably secure the second receiver to the bar. The self-locking universal trailer hitch is utilized by securing a trailer to a towing vehicle by obtaining a towing vehicle with a first hitch receiver and a universal trailer hitch with a second hitch receiver, a bar and a second receiver having a locking mechanism, inserting the bar into the pivoting second hitch receiver, locking the bar to the second hitch receiver, inserting the bar into the second receiver and locking the bar to the second receiver via the locking mechanism.

20 Claims, 9 Drawing Sheets

SELF-LOCKING, UNIVERSAL TRAILER HITCH AND METHOD OF USE THEREOF

CROSS-REFERENCE TO RELATED APPLICATIONS

The present application is a continuation-in-part application to non-provisional patent application Ser. No. 12/267,821 entitled "SELF-LOCKING, UNIVERSAL TRAILER HITCH AND METHOD OF USE THEREOF", filed Nov. 10, 2008, and claims priority thereto and the full benefit thereof.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The preferred embodiment relates generally to a self-locking, universal trailer hitch and method of use, and more specifically to a universal trailer hitch comprising a removable bar that replaces a standard hitch ball and a receiving device for the bar that can alternately be directly secured to a trailer or which can utilize an adapter for securing to an existing hitch on a trailer.

2. Description of Related Art

The most common hitch employed for securing a trailer to a towing vehicle utilizes a trailer ball mounted on the rear of a towing vehicle releasably coupled to a trailer ball socket housing typically mounted on the trailer tongue. When the trailer is small and of light weight, the job of coupling the trailer to the towing vehicle is easily accomplished simply by moving the trailer to the vehicle. However, when a trailer is itself extremely heavy, and particularly when it is carrying a heavy load, such as a heavy boat or camper, it is normally not practical to attempt to pull the trailer to the towing vehicle for the purposes of coupling the trailer to the vehicle. Therefore, with heavy trailer equipment, the common practice is to support the tongue with an adjustable jack and maneuver the vehicle until the ball and trailer couple are aligned and suitably positioned for engagement.

Unfortunately, maneuvering a tow vehicle is a difficult task and reaching alignment of the tow vehicle hitch ball with the trailer hitch is complex, particularly for those who are inexperienced. Due to the weight of the trailer, such cannot readily be lifted and maneuvered so that its hitch is positioned over the tow vehicle hitch ball to form the coupling operation.

A common practice for aligning a towing vehicle with a detached trailer is for one person to monitor the progress of the vehicle towards the trailer while another person operates the towing vehicle. Another practice has been to attach some type of elevated visible marker to the trailer at the location of the trailer ball to assist the driver of the towing vehicle in aligning the vehicle with the trailer, and, once aligned, the driver alone completes the coupling. Appropriately positioned auxiliary mirrors have also been employed.

While it is possible for the vehicle driver to carry out this process alone, engagement under these circumstances is difficult since the vehicle driver is normally required to alternate his/her progress towards the trailer with getting out of his/her tow vehicle to observe how well aligned his/her tow vehicle is with the trailer. It would therefore be desirable to provide a trailer hitch which would enable the driver of the towing vehicle to bring his/her tow vehicle and the trailer into coupling alignment and also to automatically couple and lock the towing vehicle with the trailer, once so aligned.

Various attempts have been made in the past to provide an automatic trailer hitch. One device teaches an automatic trailer hitch having a mountable receiving unit and a separate shank unit. The funnel-shaped receiving unit is mounted on the rear of a towing vehicle, while the shank unit, which supplies the elongated member, is readily removably attached to the ball socket housing of a trailer. While such a device allows utilization of existing trailer hitches, it offers only limited alignment during the attachment process.

Another previous device teaches a swiveling trailer hitch guide. The guide is designed for mounting onto a vehicle bumper having a hitch ball structure. The trailer tongue is forcibly centered over the top of the hitch ball structure during the attachment process. While this device makes the alignment process easier, such a device does not modify the attachment properties of the standard tongue and ball hitch apparatus.

Other devices provide guide rails to direct the trailer hitch toward and onto an existing hitch ball, and while providing some guidance, do not permit approaching the trailer with a tow vehicle from an angle other than directly aligned.

Therefore, it is readily apparent that there is a need for a self-locking, universal trailer hitch that is easy to utilize during the attachment process, facilitates alignment, optionally allows an angled approach, and may also removably secured to a standard trailer hitch receiver.

BRIEF SUMMARY OF THE INVENTION

Briefly described, in a preferred embodiment, the present invention overcomes the above-mentioned disadvantages and meets the recognized need for such a device by providing a self-locking, universal trailer hitch comprising a hitch receiver, a bar and a second receiver secured to a trailer, wherein the hitch receiver is secured to a towing vehicle, and wherein the bar is removably secured to the hitch receiver, and wherein the second receiver comprises a self-locking mechanism to removably secure the second receiver to the bar.

According to its major aspects and broadly stated, the preferred embodiment is a self-locking, universal trailer hitch comprising a bar and a second receiver. The bar comprises a beveled ball with a throughhole therein, wherein the beveled ball is adapted to be received by and secured to a hitch receiver. The second receiver is adapted to receive the bar and comprises a locking pin. The beveled ball of the bar horizontally pivots about the locking pin, and the locking pin secures the bar to the second receiver. The throughhole of the beveled ball is dimensioned to receive the locking pin, and the locking pin cooperatively engages the throughhole of the beveled ball.

The bar further comprises cylindrical sections. The cylindrical sections provide clearance between the bar and the sides of the second receiver when the bar approaches the second receiver at an angle. The locking pin comprises a rounded tip at the end thereof. The rounded tip is contacted by the beveled ball during connection of the self-locking universal trailer hitch to a tow vehicle, thereby activating the locking action. The locking pin further comprises a lip. The lip is disposed on top of a brace when the locking pin is in an unlocked position. When the beveled ball of the bar contacts the rounded tip of the locking pin, the rounded tip is moved horizontally, thereby pivoting the lip off the top of the brace. Subsequently, the locking pin is released vertically and urged via a spring into the throughhole of the beveled ball, thereby locking the bar to the second receiver.

The second receiver comprises an enclosed entrance with sides that taper from the entrance to form an orifice. The orifice is dimensioned to receive the bar as the bar is inserted into the second receiver. The second receiver further comprises a chamfer section. The chamfer section facilitates entry of the bar into the second receiver without the bar catching on edges of the orifice. In its preferred embodiment, the second receiver comprises at least four sides enclosing an entrance. The four sides form a generally pyramidal shape and taper from the entrance to form an orifice. The orifice is dimensioned to receive the bar.

The bar is inserted into the second receiver by approaching the second receiver with a towing vehicle at a selected angle. The locking pin is urged horizontally at its lower end by contact of the beveled ball of the bar with the rounded tip of said locking pin, thereby pivoting the locking pin such that the top thereof moves horizontally in a direction opposite to the movement of the lower end. The second receiver is selectively secured to a hitch adapter. The hitch adapter is secured to a standard trailer hitch receiver. The second receiver is secured to a trailer either directly or indirectly.

The preferred embodiment comprises a method of securing a trailer to a towing vehicle by first obtaining a self-locking universal trailer hitch comprising a hitch receiver, a bar and a second receiver. The bar comprises a beveled ball having a throughhole therewithin. The second receiver comprises a self-locking mechanism having a locking pin. The locking pin comprises a rounded tip and a lip. Subsequently, the bar is installed into the hitch receiver, and the bar is locked to the hitch receiver.

To release, the locking pin is secured in an unlocked position by urging the locking pin vertically such that the lip clears a top of a brace, wherein the locking pin is subsequently urged horizontally until the lip of the locking pin is disposed over said top of the brace and releasing the locking pin, such that the lip rests on the top of the brace.

To reinstall the bar into the receiver, the bar is inserted into the second receiver, such that the beveled ball contacts the rounded tip of the locking pin, thereby horizontally pivoting the lip off of the top of the brace, such that the locking pin subsequently falls vertically into the throughhole of the beveled ball, thereby locking the bar to the second receiver.

The method further comprises the steps of adapting the self-locking universal trailer hitch for use with a standard trailer hitch receiver via a hitch adapter. Further, the self-locking universal trailer hitch may be engaged with a tow vehicle at an angle.

Additionally, the preferred embodiment is a self-locking universal trailer hitch comprising a hitch receiver, a bar comprising a beveled ball with a throughhole and a second receiver. The second receiver is adapted to receive the bar and comprises a locking pin having a lip and a rounded tip. The lip is disposed on top of a brace, thereby securing the locking pin in an unlocked position. The bar is inserted into the second receiver, and during insertion, the beveled ball contacts the rounded tip of the locking pin, thereby pivoting the lip of the locking pin off of the brace, such that the locking pin is subsequently urged into the throughhole of the beveled ball via a spring.

More specifically, the preferred embodiment is a self-locking universal trailer hitch comprising a bar and a second receiver. The bar is secured to a first receiver on a towing vehicle and comprises a first end, a second end and a beveled ball having a throughhole. The second end connects to a beveled ball via three cylindrical sections. Each cylindrical section, from the second end to the beveled ball, is progressively smaller in diameter as they progress from the second end to the beveled ball, thereby reducing the diameter of the bar as it extends from the second end through the cylindrical sections to the beveled ball. The second receiver comprises a locking mechanism, a top, a first side, a bottom, a second side, an entrance, an orifice and a block. The block comprises a first throughhole and a chamfer section. The chamfer section comprises a second throughhole and facilitates entry of the bar without the bar catching on the edges of the orifice. The first side, the bottom, the second side and the top of the receiver taper inward from the entrance to the orifice. The receiver is shaped, for exemplary purposes only, like a cone or a pyramid. The locking mechanism comprises a locking pin, a spring, a handle, a plate and a brace. The brace comprises a top, a first side and a second side. The first side and the second side of the brace are fixably secured to the block. The top of the block comprises an aperture.

The locking pin comprises a rounded tip that is contacted by said beveled ball during connection of the self-locking universal trailer hitch to a tow vehicle. The locking pin further comprises a valley that forms a lip in the shaft of the locking pin. The spring of the locking pin comprises a top flange and a bottom flange. The block comprises a first throughhole that is dimensioned to receive the locking pin. The first throughhole comprises a first side and a second side. The first side is parallel to the locking pin and the second side is slightly angled away from the locking pin at the top of the throughhole.

To utilize the preferred embodiment, the locking pin is secured in the unlocked position by pulling the locking pin upward via the handle until the valley is aligned with the top of the brace, and the handle is pulled horizontally until the lip rests on top of the brace and the handle is then released. Once the locking pin is in the locked position, the bar is inserted into the receiver until the beveled ball contacts the rounded tip of the locking pin, thereby pushing the locking pin horizontally and slightly upward through the first throughhole and the aperture. As the locking pin moves upward, the beveled ball also pushes the locking pin away from the second side of the first throughhole in a pivoting action, such that the locking pin becomes generally vertical, thereby sliding the lip off the top of the brace. The locking pin is then urged downward by the spring and the locking pin slides downward in the throughhole of the chamfer section and engages the second throughhole, thereby securing the locking pin completely through the bar and consequently securing the bar in the second receiver.

One alternate embodiment comprises a self-locking universal trailer hitch having a first receiver, a tow bar and a second receiver. The first receiver comprises a first end, a second end, a top, a bottom, an aperture disposed at the top and an opening disposed at the second end. The tow bar has a first end, a second end, a threaded aperture and a throughhole, wherein the second end comprises a taper and a ball end disposed at the second end, wherein the ball end preferably comprises hardened steel. The tow bar is secured to the first receiver via insertion of the first end of the tow bar into the opening of the first receiver. Subsequently, a fastener cooperatively engages the threaded aperture to secure the tow bar to the first receiver, wherein the fastener extends above the aperture and the top of the first receiver, thereby preventing the tow bar from being withdrawn from the first receiver. The tow bar may selectively be fitted with a spring to allow horizontal cushioning and movement of the tow bar. The spring is secured between a flange and the second end.

The second receiver comprises a receiving structure, a locking mechanism, a vertical support, a horizontal support and a plate, wherein the receiving structure comprises a top, a first side, a bottom, a second side, an entrance and an orifice, wherein the orifice comprises chamfers to facilitate entry of the tow bar without same catching on edges within the orifice. The first side, the bottom, the second side and the top taper inward from the entrance to the orifice, wherein the receiving structure is shaped, for example, like a cone or pyramid. The receiving structure further comprises a lever holder, disposed on the first side, to secure a lever when same is not in use, and hooks, disposed on the first side and the second side, wherein the hooks are utilized to secure the receiving structure in a selected position via chains. The locking mechanism comprises the lever, a fail-safe activator, a tube, a lower block and an upper block. The tube is dimensioned to receive and removably retain the lever, wherein the tube is disposed at the top of the upper block.

The vertical support comprises a first end, a flange and a spring, wherein the spring is secured between the flange and the horizontal support to provide sprung adjustment of the height of the vertical support. The vertical support further comprises a first throughhole and a second throughhole, wherein the throughholes permit selective adjustment of the height of the vertical support by selectively inserting a cotter pin into the chosen throughhole. The vertical support may be selectively fitted with a spring to allow slight horizontal cushioning and movement of the vertical support.

The horizontal support comprises a first end, a second end and a throughhole, wherein the vertical support is disposed in the throughhole and is secured at a selected height by the cotter pin. The plate comprises throughholes for securing the plate to a desired object, such as, to a trailer, or to a hitch adapter.

The receiving structure is fixedly secured to the lower block, wherein a fail-safe activator is fixedly secured to the lower block to form an aperture, and wherein the lower block comprises an opening dimensioned to receive the tow bar such that the second end of the tow bar is disposed within the aperture. The upper block is disposed on top of the lower block and fixedly secured thereto.

The locking mechanism comprises the tube, wherein the tube comprises a first end and a second end. The first end of the tube is hingedly secured to a brace, wherein the brace comprises a first end and a second end, and wherein the second end of the brace is hingedly secured to the upper block via a pivot point, and wherein the upper block comprises a threaded bolt. A flange is disposed on the second end of the tube, wherein the flange comprises a first hook retainer, and wherein the flange is in pivotal communication with the locking pin, wherein the locking pin slides in and out of the throughhole in the upper block.

Adjustment of the threaded bolt serves to position the locking pin within the opening. A spring comprises a first hook and a second hook, wherein the first hook is secured to a first hook retainer, and wherein the second hook is removably secured to a second hook retainer, and wherein the second hook retainer is disposed at the base of the upper block.

The locking pin is slidably retained in the throughhole, wherein the throughhole comprises a first side and a second side. The locking pin comprises a tip, wherein the tip comprises a partially rounded or beveled extension, and wherein the tip is positioned on a ledge of the opening when the self-locking universal trailer hitch is activated prior to locking. To use, the tow bar is inserted into the receiving structure, wherein the taper of the tow bar contacts the partially rounded extension, thereby pushing the locking pin forward in the throughhole away from the first side toward the second side until the throughhole of the tow bar is aligned with the first side and the second side of the throughhole. The locking pin is subsequently urged downward by the spring, with the locking pin passing into the throughhole, thereby securing the locking pin inside the tow bar and consequently securing the tow bar in the second receiver. If required, the locking pin can be biased toward or away from the first side by the threaded bolt to make activation by contact of the tow bar less or more sensitive.

In another alternate embodiment, a hitch adapter can be utilized to secure the self-locking universal trailer hitch to an existing standard trailer hitch, wherein the hitch adapter has a second plate, a base plate, a first side rail, a second side rail and an adapter hitch ball. The base plate comprises a first end and a second end. The rails are dimensioned to receive the standard trailer hitch receiver therebetween with the trailer hitch receiver latching to the adapter hitch ball, and to restrict lateral movement of the trailer hitch receiver. The base plate is fixedly secured to the side rails, wherein the first side rail comprises an aperture for receiving an eye bolt, and wherein the second side rail may comprise an eye bolt or other fastener or other securing device. Wire is secured from the fastener on one side rail to the eye bolt on the other side rail and the wire is tightened via the eye bolt to secure the trailer hitch receiver to the hitch adapter.

The first end of the base plate has a threaded aperture therein. The adapter hitch ball comprises a fastener, wherein the threaded aperture is adapted to threadedly receive and secure the adapter hitch ball to the base plate. The second plate is fixedly secured to the first end of the base plate, wherein the second plate comprises throughholes, and wherein the hitch adapter is secured to the self-locking universal trailer hitch by securing the plate of the second receiver to the second plate via fasteners engaging the throughholes of the plate and the throughholes of the second plate.

The trailer hitch receiver comprises a first end, a second end, a locking mechanism and trailer brake hydraulics, wherein the trailer hitch receiver is removably secured to the hitch adapter by placing the trailer hitch receiver onto the ball of the hitch adapter and locking the trailer hitch receiver to the hitch adapter via the locking mechanism. The trailer hitch receiver is further secured to the hitch adapter via the wire to prevent accidental decoupling, wherein the wire is secured to the eye bolt, and wherein the eye bolt is removably and adjustably secured to the first side rail of the hitch adapter via inserting the eye bolt into the hole of the first side rail and retaining the eye bolt therein with a fastener. Thus, the wire prevents removal of the trailer hitch receiver from the hitch adapter until the wire is subsequently removed.

In yet another alternate embodiment, the trailer frame comprises a first rail and a second rail, wherein the rails have a height adjusting mechanism disposed and supported therebetween. The height of the trailer hitch receiver is selectively adjusted by utilizing the height adjusting mechanism.

The trailer frame further comprises a trailer brake locking mechanism, wherein the trailer brake locking mechanism comprises an arm, a spring and a cable, wherein the spring comprises a first hook and a second hook. The first hook is secured to the first rail and the second hook is removably secured to the arm. A cable is in communication with the brake hydraulics for the trailer, wherein the brake hydraulics comprise the hydraulic brake actuator for the trailer that would normally be engaged by communication with the tow vehicle. The cable is utilized to activate the brake hydraulics by pulling tension on the cable when the arm is moved to the actuated position, thereby engaging the trailer's brakes and maintaining the trailer in a fixed location, preventing rolling if the trailer is on a slope. To retain the arm in the actuated position, a latch having a hook thereon is placed over the arm, wherein the hook engages the arm retaining same in the actuated position. To release the trailer's brakes for towing, the latch is removed from the arm, wherein the arm moves upward to the non-actuated position, and wherein tension on the cable is thereby relaxed, releasing the brake hydraulics.

The rails further comprise a first hook and a second hook, respectively, wherein the first hook secures a first chain to the first rail, and wherein the second hook secures a second chain to the second rail. The first chain comprises a first end and a second end, wherein the first end comprises a third hook, and wherein the third hook secures the first chain to a tow vehicle's bumper during towing via a first hook receiver, wherein the first hook receiver is fixedly secured to the tow vehicle bumper. Similarly, the second chain comprises a first end and a second end, wherein the first end of the second chain comprises a fourth hook and wherein the fourth hook is secured during the towing operation to a tow vehicle's bumper via a second hook receiver, and wherein the second end of the second chain is secured to the second rail via the second hook.

The receiving structure is selectively secured at a fixed angle to accommodate aligning the tow bar into the entrance of the receiving structure when the tow vehicle approaches the trailer at an angle. The first chain is removably secured to hook on the first side of the receiving structure, wherein all slack is taken out of the first chain, thereby preventing the receiving structure from moving away from the first chain. Similarly, the second chain is removably secured to a hook on the second side of the receiving structure, wherein all slack is taken out of the second chain, thereby preventing the receiving structure from moving away from the second chain, and in combination with the first chain, preventing pivotal movement of the receiving structure.

In one alternate embodiment, the fail-safe activator comprises a plate disposed therethrough. The plate is in rigid communication with a rod, wherein a spring is disposed over the rod between the plate and the fail-safe activator, thereby biasing the plate forward to the middle of the fail-safe activator. The rod is secured outside of the fail-safe activator via a nut. A cable is secured at the end of the rod outside of the fail-safe activator and is in communication with the locking pin, being secured therearound in a loop. When the spring biases the plate forward, all slack is taken up from the cable. Thus, movement rearward of the cable will exert a pulling force on the cable, pulling the locking pin rearward.

To couple a tow vehicle to a trailer via the self-locking universal trailer hitch, a tow bar is inserted into the first receiver. The receiving structure is secured to the trailer either directly, or by fastening the receiving structure to the hitch adapter, wherein the hitch adapter is secured to the hitch receiver. The receiving structure is appropriately positioned at a selected angle, the locking mechanism is activated by removing the lever from the lever holder and inserting the lever into the tube. The lever is subsequently pressed downward, thereby raising the locking pin. Biasing by the threaded bolt positions the tip of the locking pin on the ledge of the opening. Insertion of the tow bar into the receiving structure trips the locking pin by contact of the taper of the tow bar with the partially rounded extension, thereby maneuvering the locking pin to drop into the throughhole to lock the tow bar to the receiving structure.

In the event that the locking pin does not trip, the ball end of the tow bar contacts the plate in the fail-safe activator, pushing same rearward against the spring, thereby placing tension on the cable that loops around the locking pin. Under tension, the cable pulls the locking pin forward causing same to fall into the throughhole.

Accordingly, a feature and advantage of the preferred embodiment is its ability to improve the speed and efficiency of securing a trailer to a tow vehicle.

Another feature and advantage of the preferred embodiment is its ability to adapt a conventional trailer ball socket coupling to an easily installed and removed automatic hitch without requiring that the trailer coupling be modified.

Still another feature and advantage of the preferred embodiment is its ability to couple the trailer and towing vehicle when the towing vehicle approaches from an angle other than straight ahead.

Yet another feature and advantage of the preferred embodiment is its ability to eliminate the need to either manually align or precisely align the trailer and towing vehicle.

Yet still another feature and advantage of the preferred and alternate embodiments is its ability to provide a hitch which can be manually positioned and restrained in a disengaged position on the towing vehicle and subsequently automatically coupled by the tow vehicle driver alone without requiring assistance.

A further feature and advantage of the preferred embodiment is its ability to secure the trailer during the attachment process.

Yet a further feature and advantage of the preferred embodiment is that it self-aligns with the towing vehicle hitch ball.

A further feature and advantage of the preferred embodiment is its ability to adapt to both light duty as well as heavy duty hitch requirements.

Yet still another feature and advantage of the preferred embodiment is its ability to provide for handicapped and elderly individuals a means for eliminating the normally heavy lifting and shifting of trailers.

A further feature and advantage of the preferred embodiment is its ability to decrease the adjustment necessary when aligning trailers to tow vehicles.

These and other features and advantages of the preferred embodiment will become more apparent to one skilled in the art from the following description and claims when read in light of the accompanying drawings.

BRIEF DESCRIPTION OF THE SEVERAL VIEWS OF THE DRAWINGS

The preferred embodiment will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATE EMBODIMENTS OF THE PREFERRED EMBODIMENT

In describing the preferred and selected alternate embodiments, as illustrated in FIGS. 1-9B, specific terminology is employed for the sake of clarity. The preferred embodiment, however, is not intended to be limited to the specific terminology so selected, and it is to be understood that each specific element includes all technical equivalents that operate in a similar manner to accomplish similar functions.

Figure 5:
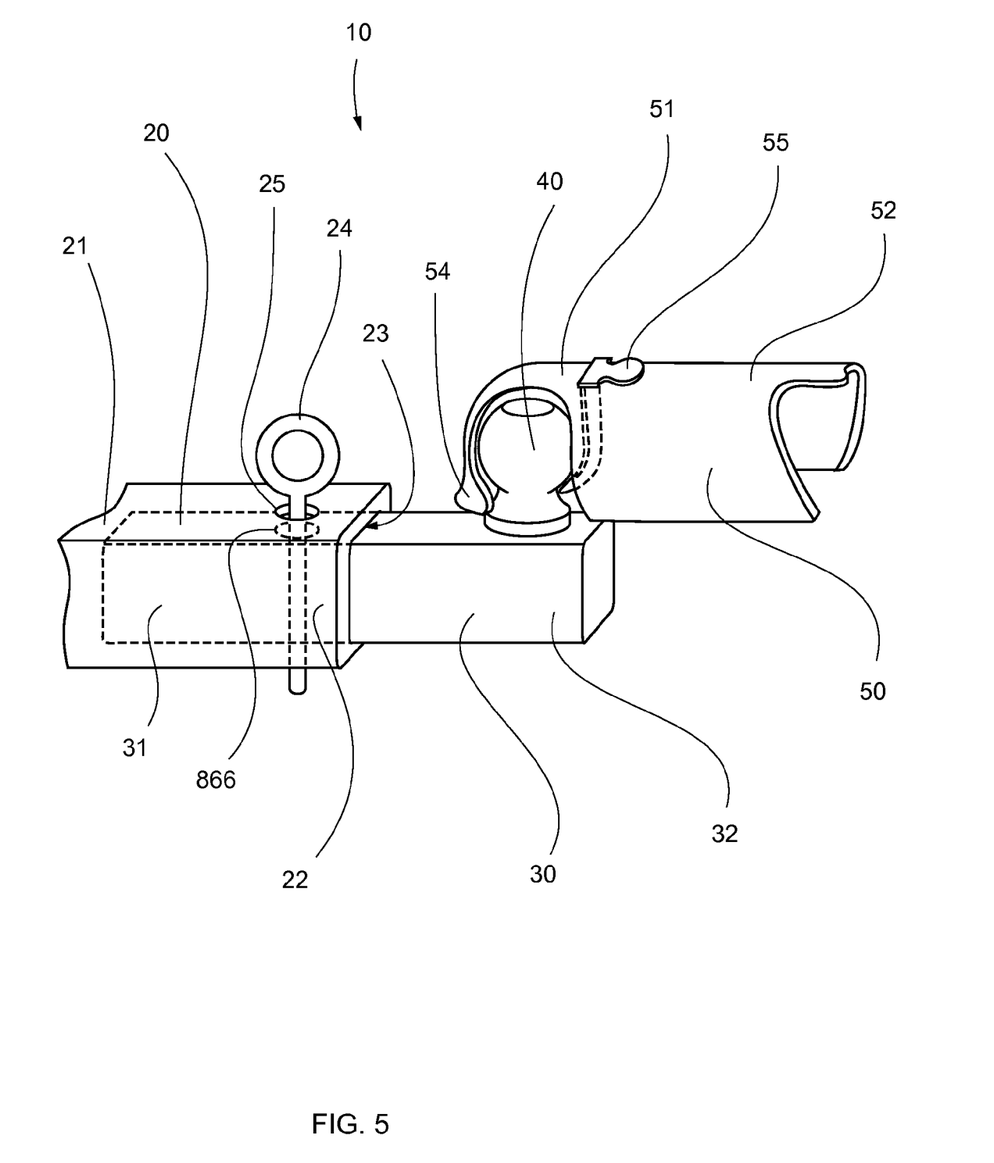
FIG. 5 is a cutaway perspective view of a prior art trailer hitch, showing a hitch ball secured to a hitch receiver commonly utilized in conventional trailer hitches.

Referring now to FIG. 5, depicted therein is a prior art embodiment comprising trailer hitch 10, wherein trailer hitch 10 comprises tow bar receiver 20, bar 30, hitch ball 40 and hitch receiver 50, and wherein tow bar receiver 20 comprises first end 21, second end 22, opening 23 and aperture 25, wherein opening 23 is disposed proximate second end 22. Bar 30 comprises first end 31, second end 32 and throughhole 866, wherein hitch ball 40 is disposed proximate second end 32 of bar 30. Hitch receiver 50 comprises first end 51, second end 52, front 54 and locking mechanism 55.

Still referring to FIG. 5, the prior art embodiment comprising trailer hitch 10 discloses inserting first end 31 of bar 30 into opening 23 of tow bar receiver 20 until aperture 25 of tow bar receiver 20 is aligned with throughhole 866 of bar 30. Pin 24 is subsequently inserted through aperture 25 of tow bar receiver 20 into throughhole 866 of bar 30, thereby removably securing bar 30 to tow bar receiver 20. Hitch receiver 50 is removably secured to bar 30 by placing front 54 of hitch receiver 50 over hitch ball 40, wherein locking mechanism 55 secures hitch receiver 50 to hitch ball 40, as such is known in the art. It will be noted that in the prior art configuration of FIG. 5, tow bar receiver 20, bar 30 and hitch receiver 50 of trailer hitch 10 are in fixed alignment, restrained at hitch ball 40, wherein trailer (not shown) having trailer hitch 50 disposed thereon can pivot only around hitch ball 40. As such, tow bar receiver 20, bar 30 and hitch receiver 50 must be precisely aligned to assemble.

Figure 1:
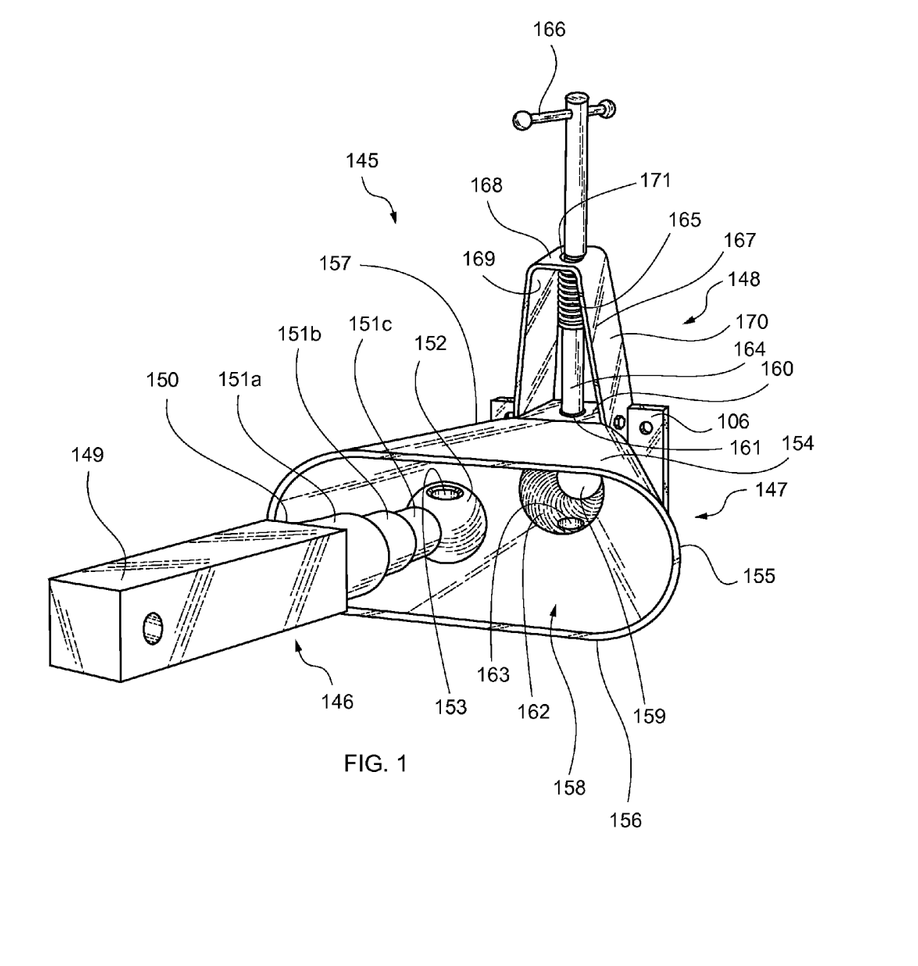
FIG. 1 is a perspective view of a universal trailer hitch according to a preferred embodiment.

Referring now to FIG. 1, depicted therein is a preferred embodiment, which overcomes the deficiencies of the prior art of FIG. 5, wherein self-locking universal trailer hitch 145 comprises bar 146 and second receiver 147. Bar 146 is secured to a first receiver (not shown) on a towing vehicle (not shown) and comprises first end 149, second end 150 and beveled ball 152, wherein beveled ball 152 comprises throughhole 153. Second end 150 is in communication with beveled ball 152 via cylindrical sections 151a, 151b and 151c, wherein cylindrical sections 151a, 151b and 151c are disposed between second end 150 and beveled ball 152, and wherein cylindrical sections 151a, 151b and 151c are progressively smaller in diameter as they progress from second end 150 to beveled ball 152. Reducing the diameter as bar 146 extends from second end 150 through cylindrical sections 151a, 151b and 151c to beveled ball 152 provides strength while improving clearance between bar 146 and sides 155, 157 (described hereinbelow) of second receiver 147 when bar 146 approaches second receiver 147 at an angle.

Second receiver 147 comprises locking mechanism 148, top 154, first side 155, bottom 156, second side 157, entrance 158, orifice 159 and block 160, wherein block 160 comprises first throughhole 161 and chamfer section 162, and wherein chamfer section 162 facilitates entry of bar 146 without bar 146 catching on edges within orifice 159, and wherein chamfer section 162 further comprises second throughhole 163. First side 155, bottom 156, second side 157 and top 154 of second receiver 147 taper inward from entrance 158 to orifice 159, wherein second receiver 147 is shaped, for exemplary purposes only, like a cone or pyramid. Locking mechanism 148 comprises locking pin 164, spring 165, handle 166, plate 106 and brace 167, wherein brace 167 comprises top 168, first side 169 and second side 170. First side 169 and second side 170 of brace 167 are fixedly secured to block 160, wherein top 168 comprises aperture 171.

Figure 2:
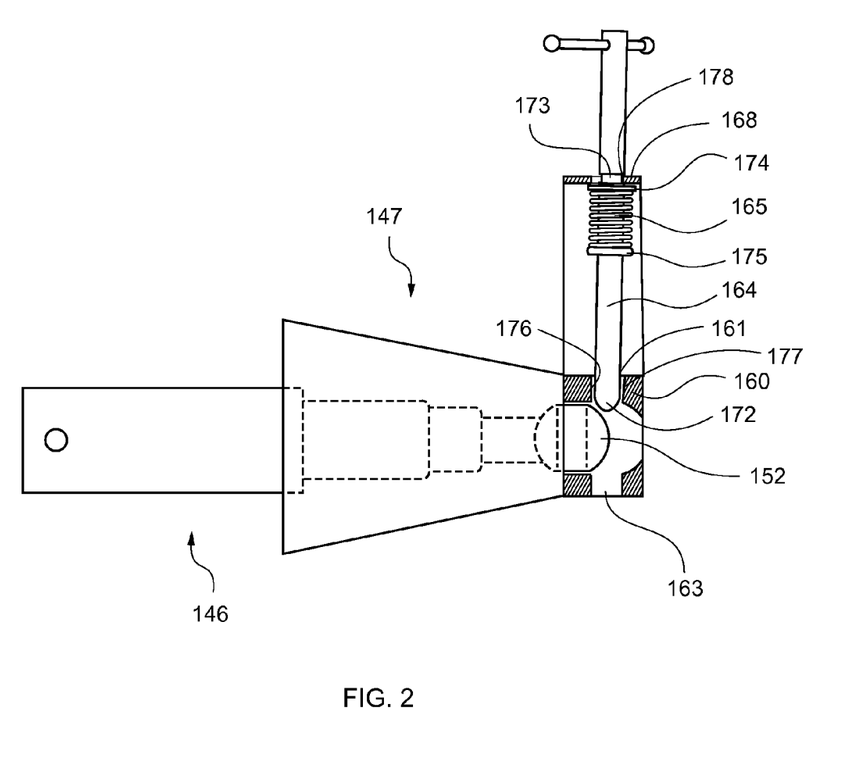
FIG. 2 is a side cross-sectional view of universal trailer hitch according to a preferred embodiment, showing a bar component partially inside the second receiver.

Referring now to FIG. 2, locking pin 164 comprises rounded tip 172 and valley 173, wherein valley 173 forms lip 178. Spring 165 comprises top flange 174 and bottom flange 175. Block 160 comprises first throughhole 161 and second throughhole 163, wherein first throughhole 161 is dimensioned to receive locking pin 164, and wherein first throughhole 161 comprises first side 176 and second side 177, and wherein first side 176 is generally parallel to locking pin 164, and wherein top of second side 177 is angled away from locking pin 164.

Figure 3:
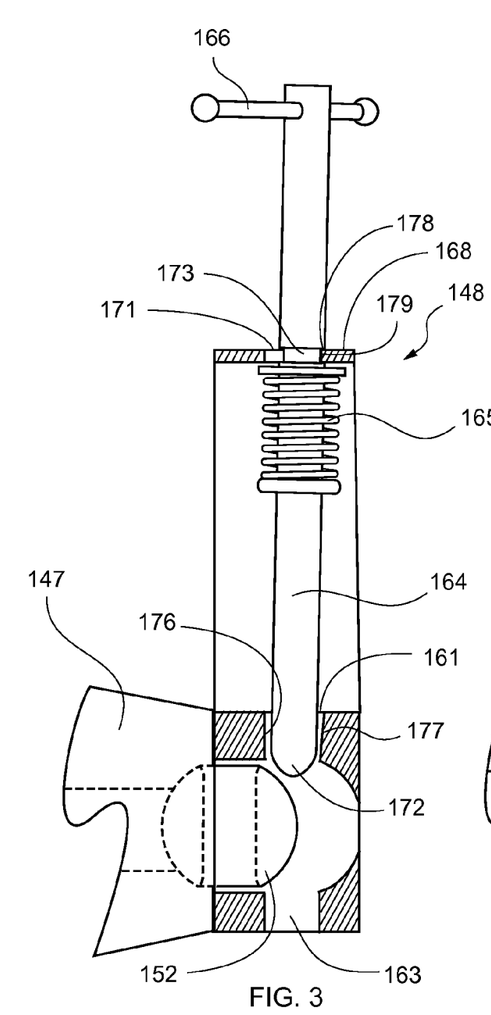
FIG. 3 is a detail side cross-sectional view of locking pin and throughhole components of a locking mechanism for a universal trailer hitch according to a preferred embodiment, shown just prior to self-locking activation.
Figure 4:
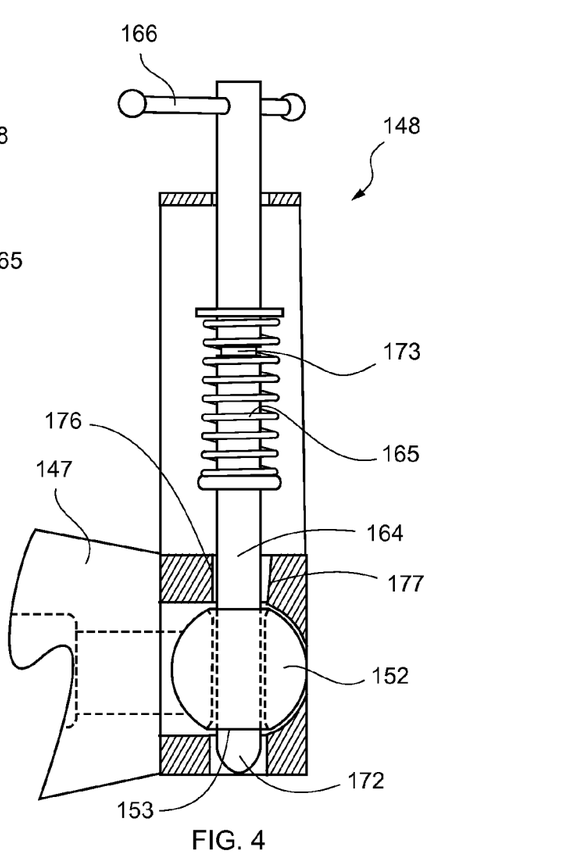
FIG. 4 is a detail cross-sectional view of locking pin and throughhole components of a locking mechanism for a universal trailer hitch according to a preferred embodiment, shown in the process of locking.

Referring now to FIGS. 3-4, to use, locking mechanism 148 is secured in the unlocked position by pulling locking pin 164 upward via handle 166 until valley 173 is aligned with top 168 of brace 167 (best shown in FIG. 1). Handle 166 is subsequently pulled horizontally and released, wherein lip 178 of locking pin 164 is secured on edge 179. To engage bar 146 with second receiver 147, bar 146 is inserted into second receiver 147 (as best shown in FIG. 2), wherein beveled ball 152 contacts rounded tip 172 of locking pin 164, thereby pushing locking pin 164 horizontally and slightly upward within first throughhole 161 and aperture 171. As locking pin 164 is moved upward, beveled ball 152 also pushes locking pin 164 away from second side 177 of first throughhole 161 in a pivoting action toward first side 176 of first throughhole 161, such that locking pin 164 becomes generally vertical, thereby sliding lip 178 horizontally off of top 168 of brace 167. Locking pin 164 is then urged downward by spring 165, wherein locking pin 164 passes into throughhole 153 of beveled ball and into second throughhole 163 of chamfer section 162, thereby securing locking pin 164 through bar 146 and consequently securing bar 146 in second receiver 147.

Figure 6A:
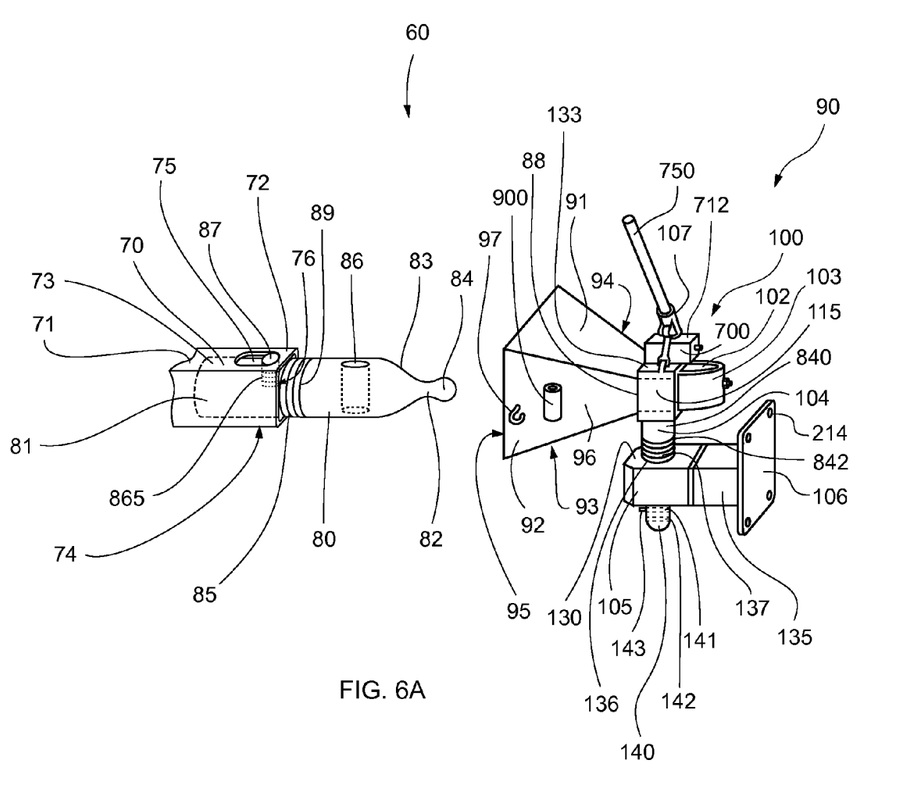
FIG. 6A is a side perspective view of a universal trailer hitch according to an alternate embodiment.
Figure 6B:
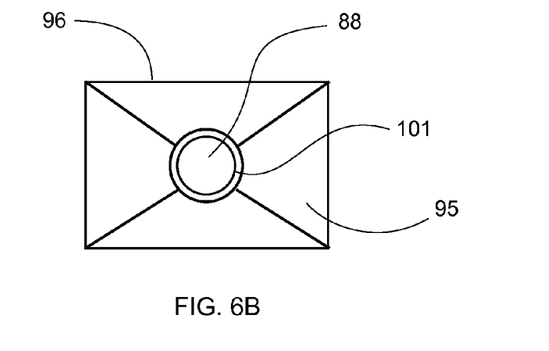
FIG. 6B is a front detail view of a receiving structure component of a universal trailer hitch according to an alternate embodiment.

Referring now to FIGS. 6A and 6B, depicted therein is an alternate embodiment, wherein universal trailer hitch 60 comprises first receiver 70, tow bar 80 and second receiver 90. First receiver 70 comprises first end 71, second end 72, top 73, bottom 74, aperture 75 disposed at top 73 and opening 76 disposed at second end 72. Tow bar 80 comprises first end 81, second end 82, threaded aperture 865 and throughhole 86, wherein second end 82 comprises taper 83 and ball end 84 disposed at second end 82, wherein ball end 84 preferably comprises hardened steel. Tow bar 80 is secured to first receiver 70 via insertion of first end 81 of tow bar 80 into opening 76 of first receiver 70. Subsequently, fastener 87 cooperatively engages threaded aperture 865 to secure tow bar 80 to first receiver 70, wherein fastener 87 extends above aperture 75 and top 73 of first receiver 70, thereby preventing tow bar 80 from being removed from first receiver 70. Tow bar 80 may selectively be fitted with spring 85 to allow horizontal cushioning and movement of tow bar 80. Spring 85 is secured between flange 89 and second end 72.

Still referring to FIGS. 6A and 6B, second receiver 90 comprises receiving structure 96, locking mechanism 100, vertical support 104, horizontal support 105 and plate 106, wherein receiving structure 96 comprises top 91, first side 92, bottom 93, second side 94, entrance 95 and orifice 88 (best shown in FIG. 6B), wherein orifice 88 comprises chamfers 101 to facilitate entry of tow bar 80 without same catching on edges within orifice 88. First side 92, bottom 93, second side 94 and top 91 taper inward from entrance 95 to orifice 88, wherein receiving structure 96 is shaped, for exemplary purposes only, like a cone or pyramid. Receiving structure 96 further comprises lever holder 900, disposed on first side 92, to secure lever 750 when same is not in use, and hooks 97, 98 (best shown in FIG. 7A), disposed on first side 92 and second side 94, respectively, wherein hooks 97, 98 are utilized to secure receiving structure 96 in a selected position via chains 410, 420, respectively (best shown on FIG. 9B and discussed more fully hereinbelow). Locking mechanism 100 comprises lever 750, optional fail-safe activator 103, tube 107, lower block 115 and upper block 700.

Vertical support 104 comprises first end 840, flange 842 and spring 137, wherein spring 137 is secured between flange 842 and horizontal support 105 to provide sprung adjustment of the height of vertical support 104, as detailed more fully hereinbelow. Vertical support 104 further comprises first throughhole 141 and second throughhole 142, wherein throughholes 141, 142 permit selective adjustment of the height of vertical support 104 by selectively inserting cotter pin 143 into the chosen throughhole 141 or 142. It will be recognized by those skilled in the art that additional throughholes could be provided to facilitate positioning of vertical support 104 at different heights. Further, it will be recognized that other means of height adjustment could be utilized for positioning of vertical support 104 without departing from the spirit of the alternate embodiment.

Horizontal support 105 comprises first end 130, second end 135 and throughhole 136, wherein vertical support 104 is disposed in throughhole 136 and is secured at a selected height by cotter pin 143 as noted hereinabove. Plate 106 comprises throughholes 214 for securing plate 106 to a desired object, such as, for exemplary purposes only, to a trailer, or to hitch adapter, as discussed hereinbelow.

Receiving structure 96 is fixedly secured to lower block 115, wherein fail-safe activator 103 is fixedly secured to lower block 115 to form aperture 102, and wherein lower block 115 comprises opening 118 (shown in FIG. 7C) dimensioned to receive tow bar 80 such that second end 82 of tow bar 80 is disposed within aperture 102. Upper block 700 is disposed on top 133 of lower block 115, wherein upper block 700 is fixedly secured to lower block 115.

Tube 107 is dimensioned to receive and removably retain lever 750, wherein tube 107 is disposed at top 712 of upper block 700. Lower block 115 is further fixedly secured to first end 840 of vertical support 104, wherein vertical support 104 is springingly secured to horizontal support 105 by inserting first end 840 of vertical support 104 through throughhole 136 of horizontal support 105, and wherein vertical support 104 is removably secured to horizontal support 105 by inserting cotter pin 143 into throughhole 141 or throughhole 142, wherein throughholes 141 and 142 are covered by removable retainer 140. As noted hereinabove, vertical support 104 may be selectively fitted with spring 137 to allow slight horizontal cushioning and movement of vertical support 104.

Figures 7A, 7E:
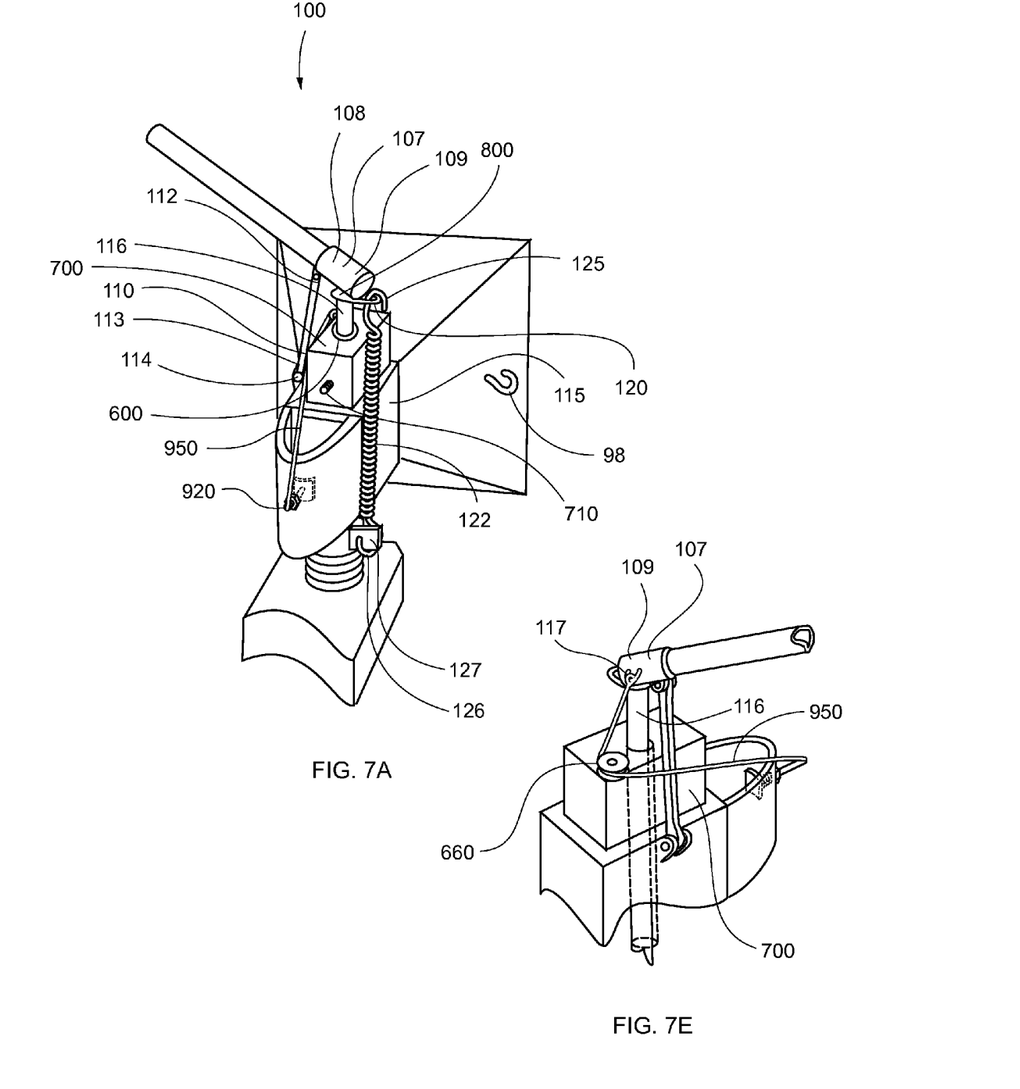
FIG. 7A is a rear perspective view of a second receiver of a universal trailer hitch according to an alternate embodiment.
FIG. 7E is a detail perspective view of a fail-safe activator component of a locking mechanism for a universal trailer hitch according to an alternate embodiment.

Turning now to FIG. 7A, illustrated therein is locking mechanism 100, wherein locking mechanism 100 comprises tube 107, wherein tube 107 comprises first end 108 and second end 109. First end 108 of tube 107 is hingedly secured to brace 110, wherein brace 110 comprises first end 112 and second end 113, and wherein second end 113 of brace 110 is hingedly secured to upper block 700 via pivot point 114, and wherein upper block 700 comprises threaded bolt 710, and wherein upper block lower 700 is disposed on lower block 115. Flange 800 is disposed on second end 109 of tube 107, wherein flange 800 comprises first hook retainer 120, and wherein flange 800 is in pivotal communication with locking pin 116, wherein locking pin 116 slides in and out of throughhole 600 of upper block 700. Adjustment of threaded bolt 710 serves to position locking pin 116 within opening 118 as is discussed hereinbelow. Spring 122 comprises first hook 125 and second hook 126, wherein first hook 125 is secured to first hook retainer 120, and wherein second hook 126 is removably secured to second hook retainer 127, wherein second hook retainer 127 is disposed at base of lower block 115.

Figure 7B:
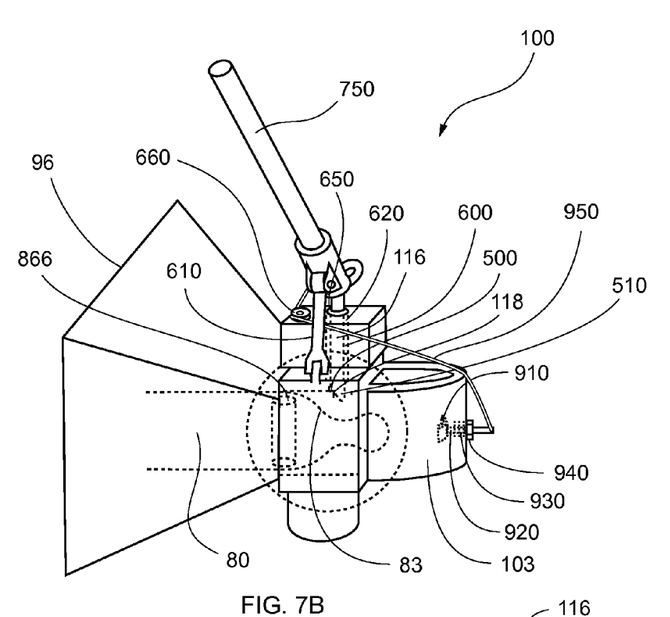
FIG. 7B is a side perspective view of a second receiver component of a universal trailer hitch according to an alternate embodiment, showing a hitch bar component partially inside the second receiver.
Figure 7C:
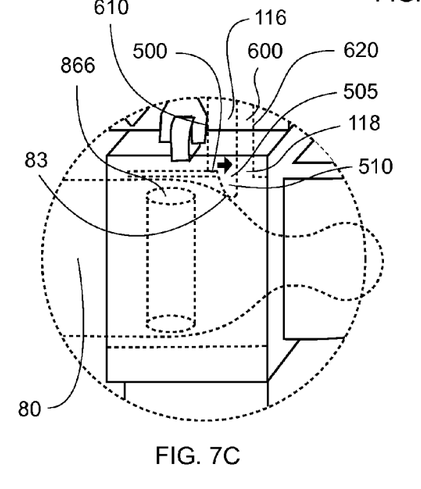
FIG. 7C is a detail perspective view of pin and throughhole components of a locking mechanism for a universal trailer hitch according to an alternate embodiment, shown just prior to self-locking activation.
Figure 7D:
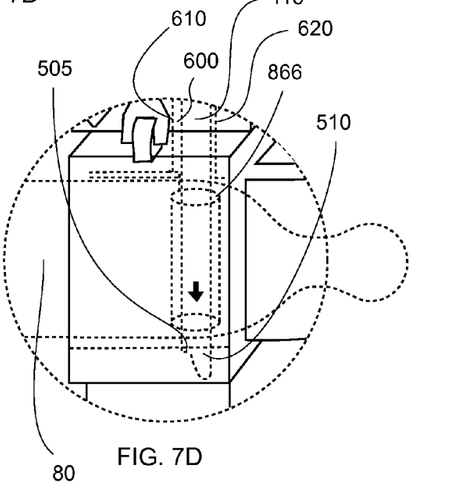
FIG. 7D is a detail perspective view of pin and throughhole components of a locking mechanism for a universal trailer hitch according to an alternate embodiment, shown in the process of locking.

Referring now to FIGS. 7B-7D, locking pin 116 is slidably retained in throughhole 600, wherein throughhole 600 comprises first side 610 and second side 620. Locking pin 116 comprises tip 505, wherein tip 505 comprises beveled or partially rounded extension 510, and wherein tip 505 is positioned on ledge 500 of opening 118 when self-locking universal trailer hitch 60 is activated prior to locking. To use, tow bar 80 is inserted into receiving structure 96, wherein taper 83 of tow bar 80 contacts partially rounded extension 510, thereby pushing locking pin 116 forward in throughhole 600 away from first side 610 toward second side 620 until throughhole 866 of tow bar 80 is aligned with first side 610 and second side 620 of throughhole 600. Locking pin 116 is subsequently urged downward by spring 122, wherein locking pin 116 passes into throughhole 866, thereby securing locking pin 116 inside tow bar 80 and consequently securing tow bar 80 in second receiver 90. If required, locking pin 116 can be biased toward or away from first side 610 by threaded bolt 710 to make activation by contact of tow bar 80 less or more sensitive.

Figure 8:
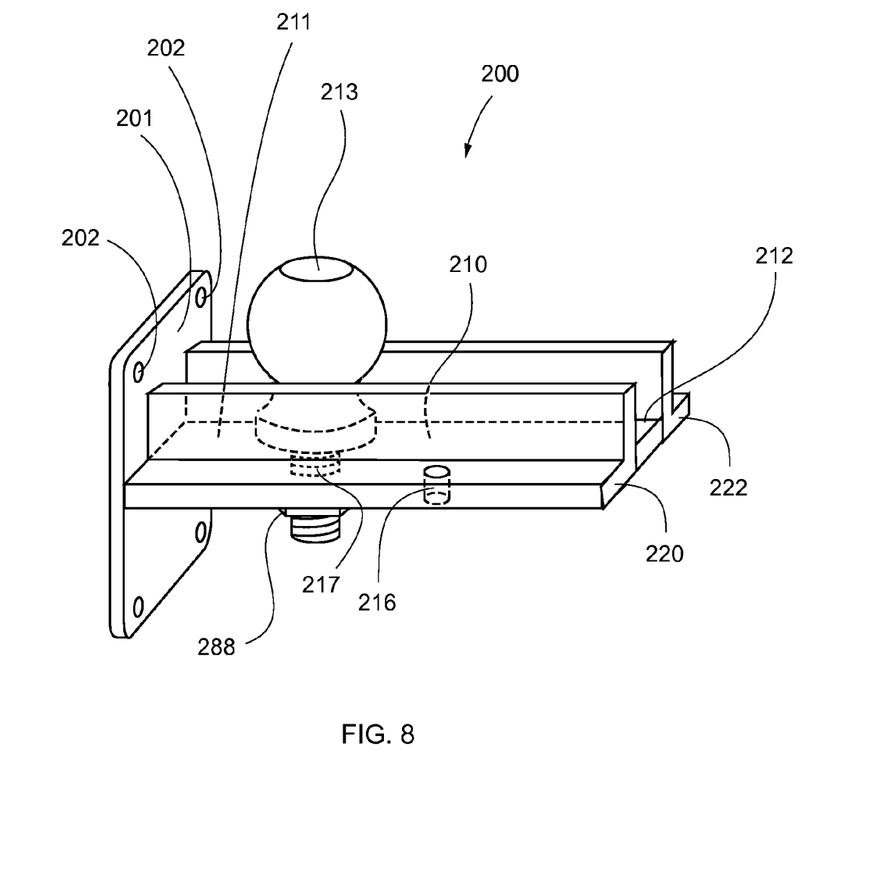
FIG. 8 is a side perspective view of a hitch adapter component according to an alternate embodiment.

Referring now more specifically to FIG. 8, illustrated therein is an alternate embodiment, comprising hitch adapter 200, wherein hitch adapter 200 comprises second plate 201, base plate 210, first side rail 220, second side rail 222 and adapter hitch ball 213, and wherein base plate 210 comprises first end 211 and second end 212. Rails 220, 222 are dimensioned to receive trailer hitch receiver 310 therebetween (best shown in FIG. 9A) and to restrict lateral movement of trailer hitch receiver 310. Base plate 210 is fixedly secured to first side rail 220 and second side rail 222, wherein first side rail 220 comprises aperture 216 for receiving eye bolt 328 (shown in FIG. 9A), and wherein second side rail 222 may comprise an eye bolt or other fastener or securing device (not shown), and wherein wire 326 (best shown in FIG. 9A) is secured from fastener (not shown) on second side rail 222 to eye bolt 328 on first side rail 220 and tightened via eye bolt 328 to secure trailer hitch receiver 310 to hitch adapter 200 as will be described more fully hereinbelow. First end 211 of base plate 210 comprises threaded aperture 217. Ball 213 comprises fastener 288, wherein threaded aperture 217 is adapted to threadedly secure ball 213 to base plate 210. Second plate 201 is fixedly secured to first end 211 of base plate 210, wherein second plate 201 comprises throughholes 202, and wherein hitch adapter 200 is secured to self-locking universal trailer hitch 60 by securing plate 106 of second receiver 90 (best shown in FIG. 6A) to second plate 201 via fasteners 223 (best shown in FIG. 9A) engaging throughholes 214 on plate 106 and throughholes 202 of second plate 201.

Figure 9A:
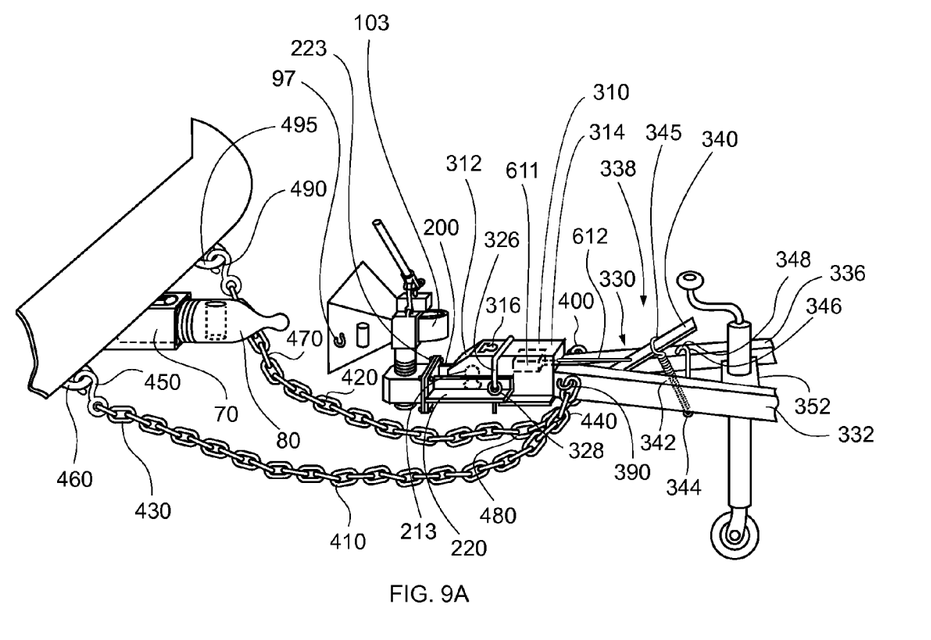
FIG. 9A is a side perspective view of a universal trailer hitch in use with a hitch adapter according to an alternate embodiment.

Referring now more specifically to FIG. 9A, illustrated therein is trailer hitch receiver 310 and trailer frame 330. Trailer hitch receiver 310 comprises first end 312, second end 314, locking mechanism 316 and trailer brake hydraulics 611, wherein trailer hitch receiver 310 is removably secured to hitch adapter 200 by placing trailer hitch receiver 310 onto ball 213 of hitch adapter 200 and locking trailer hitch receiver 310 to hitch adapter 200 via locking mechanism 316. Trailer hitch receiver 310 is further secured to hitch adapter 200 to prevent accidental decoupling via wire 326, wherein wire 326 is secured to eye bolt 328, and wherein eye bolt 328 is removably and adjustably secured to first side rail 220 of hitch adapter 200 via inserting eye bolt 328 into aperture 216 of first side rail 220 (best shown in FIG. 8) and retaining eye bolt 328 with a fastener (not shown). Thus, wire 326 prevents removal of trailer hitch receiver 310 from hitch adapter 200 until wire 326 is subsequently removed.

Figure 9B:
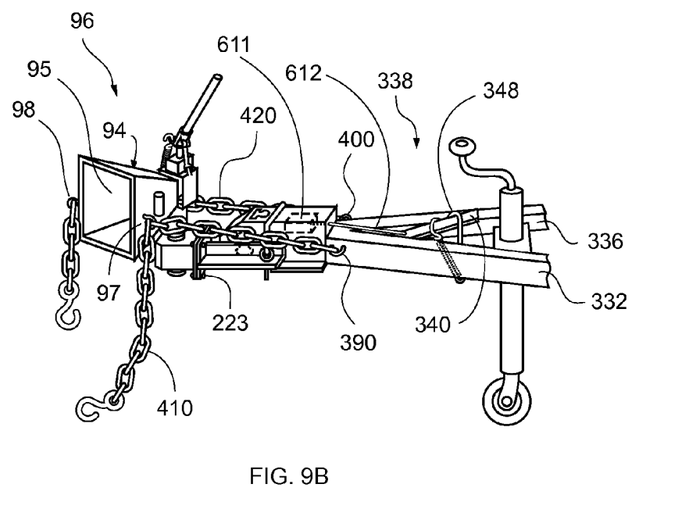
FIG. 9B is a side perspective view of a second receiver component according to an alternate embodiment, shown with the second receiver constrained at an angle by safety chains.

Referring to FIGS. 9A and 9B, trailer frame 330 comprises first rail 332 and second rail 336, wherein rails 332, 336 have height adjusting mechanism 352 disposed and supported therebetween. Height of trailer hitch receiver 310 is selectively adjusted by utilizing height adjusting mechanism 352, as such is known in the art.

Trailer frame 330 further comprises trailer brake locking mechanism 338, wherein trailer brake locking mechanism 338 comprises arm 340, spring 342 and cable 612, wherein spring 342 comprises first hook 344 and second hook 345. First hook 344 is secured to first rail 332 and second hook 345 is removably secured to arm 340. Cable 612 is in communication with brake hydraulics 611, wherein brake hydraulics 611 comprises the hydraulic brake actuator for the trailer that would normally be engaged by communication with the tow vehicle. Cable 612 is utilized to activate brake hydraulics 611 by pulling tension on cable 612 when arm 340 is moved to the actuated position (best shown in FIG. 9B), thereby engaging the trailer's brakes and maintaining the trailer in a fixed location, preventing rolling if the trailer is on a slope. To retain arm 340 in the actuated position of FIG. 9B, latch 346 having hook 348 thereon is placed over arm 340, wherein hook 348 engages arm 340 retaining same in the actuated position. To release the trailer's brakes for towing, latch 346 is removed from arm 340, wherein arm 340 moves upward to the non-actuated position of FIG. 9A, and wherein tension on cable 612 is thereby relaxed, releasing brake hydraulics 611.

Rails 332, 336 further comprise first hook 390 and second hook 400, respectively, wherein first hook 390 secures first chain 410 to first rail 332, and wherein second hook 400 secures second chain 420 to second rail 336. First chain 410 comprises first end 430 and second end 440, wherein first end 430 comprises third hook 450, and wherein third hook 450 secures first chain 410 to a tow vehicle's bumper during towing via first hook receiver 460, wherein first hook receiver 460 is fixedly secured to the tow vehicle bumper. Similarly, second chain 420 comprises first end 470 and second end 480, wherein first end 470 of second chain 420 comprises fourth hook 490 and wherein fourth hook 490 is secured during towing operation to a tow vehicle's bumper via second hook receiver 495, and wherein second hook receiver 495 is fixedly secured to the tow vehicle bumper.

Referring now more specifically to FIG. 9B, receiving structure 96 is selectively secured at a fixed angle to accommodate aligning tow bar 80 into entrance 95 when tow vehicle approaches the trailer at an angle. First chain 410 is removably secured to hook 97 on first side 92 of receiving structure 96, wherein all slack is taken out of first chain 410, thereby preventing receiving structure 96 from moving away from first chain 410. Similarly, second chain 420 is removably secured to hook 98 on second side 94 of receiving structure 96, wherein all slack is taken out of second chain 420, thereby preventing receiving structure 96 from moving away from second chain 410, and in combination with first chain 410, preventing pivotal movement of receiving structure 96.

Referring now more particularly to FIGS. 7A, 7B and 7E, depicted therein is an optional alternate embodiment comprising fail-safe activator 103, wherein fail-safe activator 103 comprises plate 910 disposed therethrough. Plate 910 is in rigid communication with rod 920, wherein spring 930 is disposed over rod 920 between plate 910 and fail-safe activator 103, thereby biasing plate 910 forward to middle of fail-safe activator 103. Rod 920 is secured outside of fail-safe activator 103 via nut 940. Cable 950 is secured at end of rod 920 outside of fail-safe activator 103, wherein cable 950 is in communication via pulley 660 with second end 109 of tube 107, and wherein cable 950 is secured to tube 107 at attachment point 117. When spring 930 biases plate 910 forward, all slack is removed from cable 950. Thus, movement rearward of plate 910 will exert a pulling force on cable 950, pulling cable 950 around pulley 660, thereby pulling second end 109 of tube 107 forward away from fail-safe activator 103. Forward movement of tube 107 causes locking pin 116 to pivot against pivot point 650, urging tip 505 rearward off ledge 500, permitting locking pin 116 to enter throughhole 866, thereby locking tow bar 80 within receiving structure 96.

To couple tow vehicle to trailer via self-locking universal trailer hitch 60, tow bar 80 is inserted into first receiver 70 as described hereinabove. Receiving structure 96 is secured to the trailer either directly, or by fastening receiving structure 96 to hitch adapter 200, wherein hitch adapter 200 is secured to hitch receiver 310. Receiving structure 96 is appropriately positioned at a selected angle, locking mechanism 100 is activated by removing lever 750 from lever holder 900 and inserting lever 750 into tube 107. Lever 750 is subsequently pressed downward, thereby raising locking pin 116. Biasing by threaded bolt 710 positions tip 505 on ledge 500 of opening 118. Insertion of tow bar 80 into receiving structure 96 trips locking pin 116 by contact of taper 83 with partially rounded or beveled extension 510, thereby maneuvering locking pin to drop into throughhole 866 to lock tow bar 80 to receiving structure 96.

In the event that locking pin 116 does not trip, ball end 84 of tow bar 80 contacts plate 910 pushing same rearward against spring 930, placing tension on cable 950. Under tension, cable 950 pulls locking pin 116 forward causing same to fall into throughhole 86.

The foregoing description and drawings comprise illustrative embodiments of the preferred embodiment. Having thus described exemplary embodiments of the preferred embodiment, it should be noted by those skilled in the art that the within disclosures are exemplary only, and that various other alternatives, adaptations, and modifications may be made within the scope of the preferred embodiment. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the preferred embodiment is not limited to the specific embodiments illustrated herein, but is limited only by the following claims.

What is claimed is:

1. A self-locking universal trailer hitch comprising:
   a bar comprising a beveled ball having a throughhole therethrough, wherein said bar is adapted to be received by, and removably secured to a hitch receiver; and
   a second receiver, wherein said second receiver is adapted to receive said bar, wherein said second receiver comprises a locking pin, wherein said beveled ball pivots generally horizontally about said locking pin, and wherein said locking pin removably secures said bar to said second receiver.

2. The self-locking universal trailer hitch of claim 1, wherein said bar further comprises cylindrical sections, and wherein said cylindrical sections provide clearance between said bar and sides of said second receiver when said bar approaches said second receiver at an angle.

3. The self-locking universal trailer hitch of claim 1, wherein said locking pin comprises a rounded tip at the end thereof, and wherein said rounded tip is contacted by said beveled ball during connection of the self-locking universal trailer hitch to a tow vehicle.

4. The self-locking universal trailer hitch of claim 3, wherein said locking pin further comprises a lip, and wherein said lip is disposed on top of a brace when said locking pin in an unlocked position.

5. The self-locking universal trailer hitch of claim 4, wherein when said beveled ball of said bar contacts said rounded tip of said locking pin, said rounded tip is moved horizontally, thereby pivoting said lip off said top of said brace.

6. The self-locking universal trailer hitch of claim 5, wherein said locking pin when released is vertically urged via a spring into said throughhole of said beveled ball, thereby locking said bar to said second receiver.

7. The self-locking universal trailer hitch of claim 6, wherein said throughhole of said beveled ball is dimensioned to receive said locking pin, and wherein said locking pin cooperatively engages said throughhole of said beveled ball.

8. The self-locking universal trailer hitch of claim 1, wherein said second receiver comprises at least one side enclosing an entrance, and wherein said at least one side tapers from said entrance to form an orifice, and wherein said orifice is dimensioned to receive said bar as said bar is inserted into said second receiver.

9. The self-locking universal trailer hitch of claim 8, wherein said second receiver further comprises a chamfer section, and wherein said chamfer section facilitates entry of said bar into said second receiver without said bar catching on edges of said orifice.

10. The self-locking universal trailer hitch of claim 1, wherein said second receiver comprises at least four sides enclosing an entrance, wherein said at least four sides form a generally pyramidal shape, and wherein said at least four sides taper from said entrance to form an orifice, and wherein said orifice is dimensioned to receive said bar.

11. The self-locking universal trailer hitch of claim 1, wherein said bar is inserted into said second receiver by approaching said second receiver with a towing vehicle at a selected angle.

12. The self-locking universal trailer hitch of claim 1, wherein said locking pin is urged horizontally by contact of said beveled ball of said bar with said rounded tip of said locking pin, and wherein said locking pin is pivoted by said contact of said beveled ball.

13. The self-locking universal trailer hitch of claim 1, wherein said second receiver is selectively secured to a hitch adapter, and wherein said hitch adapter is secured to a standard trailer hitch receiver.

14. The self-locking universal trailer hitch of claim 1, wherein said second receiver is secured directly to a trailer.

15. A method of securing a trailer to a towing vehicle, said method comprising the steps of:
   obtaining a self-locking universal trailer hitch comprising a hitch receiver, a bar and a second receiver, wherein said bar comprises a beveled ball having a throughhole therewithin, wherein said second receiver comprises self-locking mechanism, wherein said self-locking mechanism comprises a locking pin, and wherein said locking pin comprises a rounded tip and a lip;
   installing said bar into said hitch receiver;
   locking said bar to said hitch receiver; and
   inserting said bar into said second receiver, wherein said beveled ball contacts said rounded tip of said locking pin, thereby horizontally pivoting said lip off of a brace, such that said locking pin subsequently falls vertically into said throughhole of said beveled ball, thereby locking said bar to said second receiver.

16. The method of claim 15, said method further comprising the step of:
   adapting said self-locking universal trailer hitch for use with a standard trailer hitch receiver via a hitch adapter.

17. The method of claim 16, said method further comprising the steps of:
   unlocking said locking pin by moving said locking pin vertically until said lip of said locking pin is at a top of said brace; and
   moving said locking pin horizontally until said lip of said locking pin cooperatively engages said top of said brace, wherein said lip rests on said top of said brace.

18. The method of claim 17, said method further comprising the step of:
   approaching said self-locking universal trailer hitch with a tow vehicle at an angle.

19. A self-locking universal trailer hitch comprising:
   a hitch receiver;
   a bar comprising a beveled ball, wherein said beveled ball comprises a throughhole; and a second receiver, wherein said second receiver is adapted to receive said bar, and wherein said second receiver comprises a locking pin having a lip and a rounded tip, and wherein said lip is disposed on top of a brace, thereby securing said locking pin in an unlocked position.

20. The self-locking universal trailer hitch of claim 19, wherein said bar is inserted into said second receiver, and wherein during said insertion of said bar into said second receiver, said beveled ball contacts said rounded tip of said locking pin, thereby pivoting said lip of said locking pin off of said brace, and wherein said locking pin is subsequently urged into said throughhole of said beveled ball via a spring.

* * * * *